US012215737B2

(12) United States Patent
Berger et al.

(10) Patent No.: US 12,215,737 B2
(45) Date of Patent: Feb. 4, 2025

(54) CHASSIS COMPONENT WITH A JOINT INNER PART

(71) Applicant: ZF Friedrichshafen AG, Friedrichshafen (DE)

(72) Inventors: Artur Berger, Bohmte (DE); Thomas Richter, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 139 days.

(21) Appl. No.: 18/002,872

(22) PCT Filed: Jun. 23, 2021

(86) PCT No.: PCT/EP2021/067073
§ 371 (c)(1),
(2) Date: Dec. 22, 2022

(87) PCT Pub. No.: WO2022/008238
PCT Pub. Date: Jan. 13, 2022

(65) Prior Publication Data
US 2023/0241941 A1    Aug. 3, 2023

(30) Foreign Application Priority Data

Jul. 7, 2020   (DE) ................ 10 2020 208 490.4

(51) Int. Cl.
*B60G 17/019* (2006.01)
*F16C 11/04* (2006.01)
(Continued)

(52) U.S. Cl.
CPC ............ *F16C 11/06* (2013.01); *B60G 17/019* (2013.01); *F16C 11/045* (2013.01); *G01B 7/30* (2013.01);
(Continued)

(58) Field of Classification Search
CPC ................ B60G 17/015; B60G 17/019; B60G 2204/116; B60G 2204/1162;
(Continued)

(56) References Cited

U.S. PATENT DOCUMENTS 7,045,999 B2    5/2006  Ersoy et al.
2009/0016811 A1*  1/2009  Spratte .................. G01D 5/145
                                                          403/163

FOREIGN PATENT DOCUMENTS

DE    10 2006 003 622 A1    8/2007
DE    10 2007 028 265 A1    12/2008
(Continued)

OTHER PUBLICATIONS

European Patent Office, International Search Report issued in International application No. PCT/EP2021/067073 (Aug. 5, 2021).
(Continued)

*Primary Examiner* — Justin Seo
*Assistant Examiner* — Kendrick X Liu
(74) *Attorney, Agent, or Firm* — Finch & Maloney PLLC

(57) ABSTRACT

A chassis component (1, 38, 40) has a joint inner portion (2) and a structural component (3), where the joint inner portion (2) is fitted and able to move in an articulated manner in a joint holder (4). A measuring device (5) is configured to determine a relative position of the joint inner portion (2) with respect to the structural component (3) and includes a first measuring element (6) and a second measuring element (7). The first measuring element (6) is on the structural component (3) and the second measuring element (7) is on the joint inner portion (2). In one example, the joint inner portion (2) extends out of the joint holder (4) and the second measuring element (7) is attached on a section (8) of the joint inner portion (2) which is outside the joint holder (4).

18 Claims, 13 Drawing Sheets

(51) Int. Cl.
*F16C 11/06* (2006.01)
*G01B 7/30* (2006.01)

(52) U.S. Cl.
CPC .......................... *B60G 2204/1162* (2013.01); *B60G 2401/172* (2013.01)

(58) Field of Classification Search
CPC ..................... B60G 2401/17; B60G 2401/172; G01B 7/30; F16C 11/04; F16C 11/045; F16C 11/06
See application file for complete search history.

(56) References Cited

FOREIGN PATENT DOCUMENTS

| | | |
|---|---|---|
| DE | 10 2008 045 165 A1 | 3/2010 |
| DE | 10 2019 201 521 A1 | 8/2020 |
| FR | 2 973 292 A1 | 10/2012 |

OTHER PUBLICATIONS

European Patent Office, Written Opinion issued in International application No. PCT/EP2021/067073 (Aug. 5, 2021).
German Patent Office, Office Action issued in German patent application No. 10 2020 208 490.4 (Sep. 6, 2023).

\* cited by examiner

CHASSIS COMPONENT WITH A JOINT INNER PART

RELATED APPLICATIONS

This application claims the benefit under 35 U.S.C. § 371 as a U.S. National Phase Application of application no. PCT/EP2021/067073, filed on 23 Jun. 2021, which claims benefit of German Patent Application no. 10 2020 208 490.4 filed 7 Jul. 2020, the contents of which are hereby incorporated herein by reference in their entireties.

FIELD OF THE DISCLOSURE

The invention relates to a chassis component with a joint inner portion, and with a structural component, wherein the joint inner portion is fitted into a joint holder of the structural component in a movable and articulated manner, and with a measuring device for determining a relative position of the joint inner portion in relation to the structural component, wherein the measuring device comprises a first measuring element and a second measuring element, and the first measuring element is arranged on the structural component and the second measuring element is arranged on the joint inner portion.

BACKGROUND

A chassis component of that type is known from DE 10 2019 201 521 A1. According to that document the measuring device comprises, among other things, a pin-like sensor strut, which is inserted into a blind-hole-like cavity of the structural component.

However, not every structural component provides the possibility of making a blind-hole-like cavity for arranging a measuring element inside the cavity, since more substantial operations and/or machining of the structural component in order to accommodate a measuring element can reduce the strength of the structural component to an undesirable extent.

Furthermore, from the prior art it is known that the measuring element associated with the joint inner portion should be arranged as close as possible to a kinematic point and/or a mid-point of the joint inner portion. For example, a corresponding measuring element is arranged inside a joint ball of a joint inner portion inside the rubber material of a rubber pad. At least in some cases, however, this entails greater manufacturing complexity and/or costs.

SUMMARY

The purpose of the present invention is to develop further a chassis component of the type mentioned at the outset, in such manner that an arrangement of the measuring device, the first measuring element and/or the second measuring element is simplified and can be produced more economically. In particular an alternative embodiment should be provided.

The objective on which the invention is based is achieved by a chassis component according to the present disclosure. Preferred further developments of the invention emerge from the claims and from the description that follows.

According to these the invention relates to a chassis component. In particular, the chassis component is arranged in a chassis of a vehicle, preferably a motor vehicle. A chassis component can in general be a chassis support, a transverse support, an axle support, a flange joint, a wheel carrier or a chassis linkage.

The chassis component comprises a joint inner portion. In addition, the chassis component has a structural component and the joint inner portion is fitted, movably and in an articulated manner, into a joint holder of the structural component. In particular, by virtue of the joint inner portion fitted movably and articulated in the joint holder, a joint of the chassis component is formed. The joint can be in the form of a ball joint, in particular a ball sleeve joint or a ball stud joint. Furthermore, the joint can be a rubber joint.

The chassis component comprises a measuring device for determining a relative position of the joint inner portion with respect to the structural component. In particular, the measuring device is in the form of an angle measuring device. The measuring device comprises a first measuring element and a second measuring element. In this case the first measuring element is arranged on the structural component and the second measuring element on the joint inner portion. The structural component can determine or define a contour or basic shape of the chassis component. In particular, the joint holder of the structural component is in the form of a perforation or through-going opening in the structural component. Alternatively, the joint holder of the structural component can be of pot-like and/or cup-like form. In particular, the structural component and the joint inner portion can rotate, swivel and/or tilt relative to one another. By means of the measuring device, a relative rotation, swiveling, and/or tilting of the structural component with respect to the joint inner portion and about at least one or more rotation axes, can be detected. In particular, the first measuring element and the second measuring element co-operate for determining the relative position between the joint inner portion and the structural component. In this case the joint inner portion extends out of the joint holder, and the second measuring element is attached to a section of the joint inner portion located outside the joint holder.

Here, it is advantageous that the second measuring element is neither inside the joint inner portion nor inside the joint holder. Instead, the second measuring element is attached to a section of the joint inner portion which is outside the joint holder. This ensures that the second measuring element moves or can be moved together with the joint inner portion and relative to the structural component. At the same time, the manufacturing complexity and/or the cost for arranging the second measuring element on the joint inner portion are reduced. Moreover, the arrangement of the first measuring element that co-operates with the second measuring element on the structural component is made simpler and/or less costly by arranging the second measuring element on a section of the joint inner portion that is outside the joint holder.

According to a further development, the first measuring element is fixed on an area and/or a flat surface section of the structural component. In particular, the first measuring element is fixed on the area and/or the flat surface section close to the joint holder and/or the second measuring element. Thanks to the arrangement of the first measuring element on the said area and/or the flat surface section the strength of the structural component is not compromised, or at least not substantially so. To form the flat surface section the surface of the structural component can be machined, in particular by a cutting process.

Preferably, the structural component has an attachment feature for fixing the first measuring element to the area and/or the flat surface section. For that, the attachment feature can co-operate with a suitably designed fixing means. Such a fixing means can be in the form of a screw, a pin, or a rivet. The fixing means can be screwed, pressed, and/or cast onto the attachment site. The attachment feature can be in the form of a blind hole. However, since the attachment feature is designed exclusively to receive the fixing means and not part or the whole of the first measuring element itself, the strength of the structural component is not substantially affected.

In a further embodiment, the first measuring element has an orientation element for its correctly orientated arrangement and/or fixing on the structural component. In particular, the structural component has an orientated receiving holder for holding the orientation element. Preferably, the orientation element is held and/or inserted in a form-enclosed manner into an orientated holder. The orientation element can be in the firm of a projection or nose of the first measuring element, By virtue of the co-operation of the orientation element with the orientated receiving holder and in particular in combination with the co-operation of the fixing holder and the fixing means, a specific orientation of the first measuring element or a specific direction of the first measuring element relative to the structural component and/or relative to the second measuring element, is ensured. Preferably, by virtue of the co-operation of the orientation element with the orientated receiving holder and in particular in combination with the co-operation of the fixing holder and the fixing means, an undesired rotation of the first measuring element relative to the structural component is reliably prevented or blocked.

According to a further embodiment the part of the joint inner portion with the second measuring element is a free end—in particular a stepped free end—of the joint inner portion. In this case the free end of the joint inner portion can have a simple, stepped external contour. In particular, owing to the stepped external contour an outer diameter of an outer step section of the joint inner portion is smaller than that of a step section of the joint inner portion which is farther inside relative to a central longitudinal axis of the inner joint portion and the outer step section.

The second measuring element can have an annular holding section. Preferably, the annular holding section of the second measuring element is pushed and/or pressed onto the section of the joint inner portion, particularly its outer step section. In that case the inner step section of the joint inner portion can serve as an abutment for the holding section. In particular, the annular holding section is pushed and/or pressed onto an outer circumference of the section of the joint inner portion. In that way the second measuring element can be connected to the joint inner portion in a simple and inexpensive manner.

Preferably the second measuring element, in particular the holding section of the second measuring element, and the section of the joint inner portion that co-operates with the second measuring element, form a rotation-preventing means that prevents and/or blocks a relative movement and/or rotation of the second measuring element relative to the joint inner portion, especially about a central longitudinal axis of the joint inner portion. Thus, by means of the said rotation-preventing means a relative movement between the second measuring element and the joint inner portion is prevented or blocked. The rotation-prevention means can be in the form of at least one flat area on an outer circumference of the section of the joint inner portion that co-operates with a correspondingly formed further flat area on an inner circumference of the second measuring element, in particular of the holding section of the second measuring element.

In particular, the flat areas on the outer circumference of the section of the joint inner portion and on the inner circumference of the second measuring element co-operate with interlock. An interlock of this type or flat areas of this type can be produced simply and inexpensively. Alternatively, the section of the joint inner portion can have a polygonal or out-of-round outer circumference, which co-operates with a correspondingly shaped polygonal or out-of-round inner circumference of the second measuring element. In that way too rotation can be simply and effectively prevented.

Preferably, the first measuring element comprises at least one magnetic field sensor and the second measuring element comprises a magnet. The magnet can be a permanent magnet. Without having to supply energy from the outside the magnet produces a magnetic field, which is in functional connection with the magnetic field sensor of the first measuring element. In particular, the first measuring element comprises a number of magnetic field sensors, preferably three of them. In particular, the said plurality of magnetic field sensors is positioned along and/or close to a movement path of the magnet during the normal use of the chassis component. By virtue of the plurality of magnetic field sensors the signal quality of the measuring device can be increased and/or improved. The magnetic field sensor can be a Hall sensor.

The magnet is arranged at a free end of a web-like projection of the second measuring element. In this case the magnet and/or the web-like projection are orientated in such manner as to be facing toward the first measuring element and/or the magnetic field sensor. Preferably, the first measuring element and the second measuring element are orientated and/or arranged relative to one another so that a distance between the magnet and the magnetic field sensor is smaller than 10 mm. Preferably, the web-like projection extends in the radial direction from a holding section of the second measuring element outward over an outer circumference of the joint inner portion. Preferably, the web-like projection and the holding section of the second measuring element are made integrally, as one piece.

According to a further development the magnet is arranged and/or encapsulated inside a magnet holder made of plastic. In that way the magnet can be protected against environmental influences, dirt, and/or stone chips. In particular, the magnet and/or the magnet holder is attached to the web-like projection by a releasable plug-in and/or latch-type connection. By virtue of the said releasable plug-in and/or latch-type connection the magnet can, if necessary, be changed or replaced in a simple manner. To form the plug-in and/or latch-type connection the magnet holder and the web-like projection can comprise interlocking elements that correspond with one another, in particular at least one latch detent and at least one detent receiver. Alternatively, the magnet holder can be directly formed and/or injection-molded onto the web-like projection by an injection-molding process.

In a further development the second measuring element, in particular a magnet of the second measuring element, is inserted at least partially into a guideway of the first measuring element. Thus, the first measuring element comprises a guideway for guiding the second measuring element, in particular the magnet of the second measuring element. In that way, by means of the guideway a rotation of the second measuring element about a central longitudinal axis of the joint inner portion is made possible. At the same time, by means of the guideway a tilting of at least part of the second measuring element, in particular the magnet of the second measuring element axially relative to the central longitudinal axis is at least partially or completely compensated, counteracted and/or blocked. In other words, in that way by means of the guideway a rotation of the second measuring element about the central longitudinal axis of the joint inner portion is enabled and at the same time a tilting at least of the magnet of the second measuring element about a rotation axis transverse or perpendicular to the central longitudinal axis of the joint inner portion is at least partially or completely compensated, counteracted and/or blocked. In that way undesired interfering factors caused by the tilting of the magnet about the rotation axis transverse or perpendicular to the central longitudinal axis can be avoided.

Preferably, a web-like projection of the second measuring element comprises a first projecting section and a second projecting section. The first projecting section and the second projecting section can be connected to one another by a hinge so that they can pivot relative to one another. In particular, by virtue of the hinge a tilting movement of the second measuring element in the axial direction relative to the central longitudinal axis of the joint inner portion and/or about a rotation axis transverse or perpendicular to the central longitudinal axis can be compensated.

In particular, the joint inner portion is in the form of a ball sleeve, a joint sleeve or a rubber joint. A joint formed by a combination of the joint inner portion and the joint holder of the structural component can be in the form of a ball joint or a rubber joint. Preferably, the joint sleeve co-operates with a rubber pad inside the joint holder to form a rubber joint. Owing to the arrangement of the second measuring element, the positioning of the measuring device on the section of the joint inner portion concerned outside the joint holder is considerably simplified. The chassis component can be in the form of a control arm, for example a two-point control arm.

BRIEF DESCRIPTION OF THE DRAWINGS

Below, the invention is explained in greater detail with reference to the figures. In these, the same indexes denote the same, similar or functionally equivalent components. The figures show.

DETAILED DESCRIPTION

Figure 1:
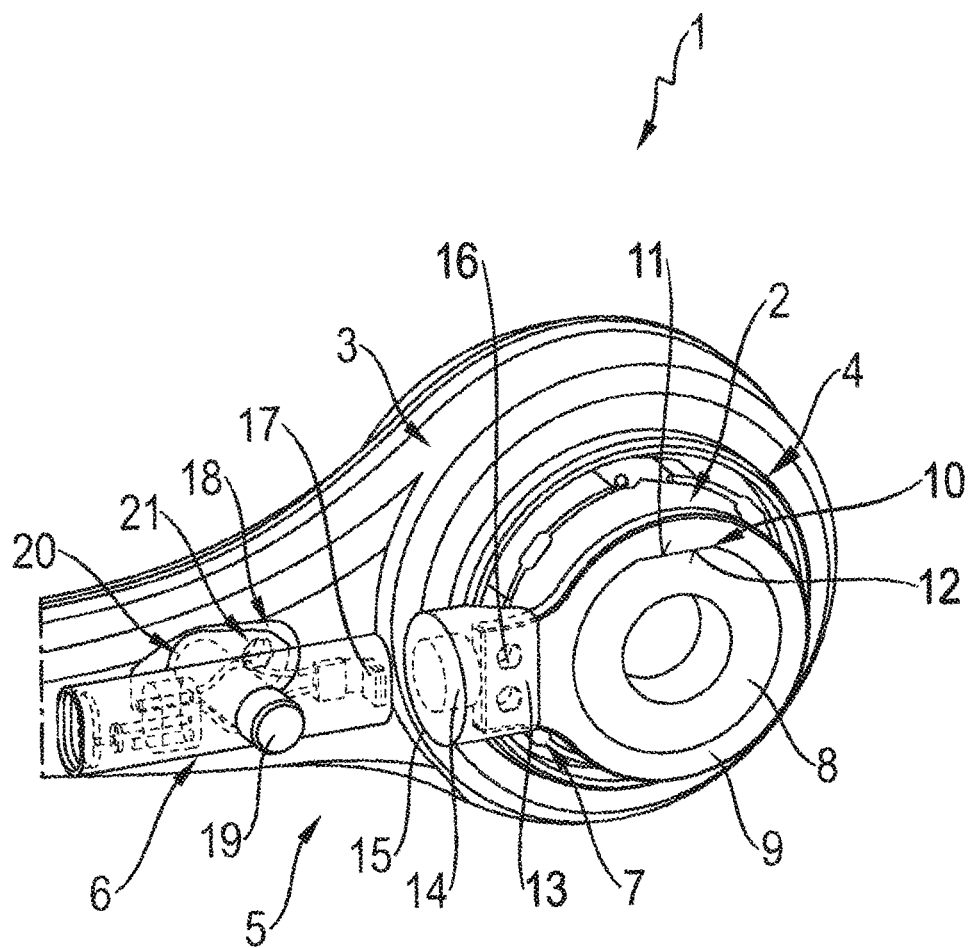
FIG. 1: Part of a perspective and partially transparent side view of a first chassis component according to the invention.

FIG. 1 shows part of a perspective and partially transparent side view of a first chassis component 1 according to the invention. The chassis component 1 comprises a joint inner portion 2 and the structural component 3. The joint inner portion 2 in this example embodiment is in the form of a joint sleeve made of metal. The structural component 3 determines the basic shape of the chassis component 1. The structural component 3 is strong and of stable shape in its own right, and in this example embodiment is made of metal. Furthermore, the structural component 3 comprises a joint holder 4. In this case the joint holder 4 is in the form of a perforation or through-going opening in the structural component 3. The joint inner portion is fitted into the joint holder 4, in which it can move in an articulated manner.

In addition, the chassis component 1 has a measuring device 5. The measuring device 5 is designed to determine a relative position of the joint inner portion 2 with respect to the structural component 3. For this, the measuring device 5 comprises a first measuring element 6 and a second measuring element 7. The first measuring element 6 is arranged or fixed on the structural component 3 and the second measuring element 7 is arranged or fixed on the joint inner portion 2. Here, the first measuring element 6 is shown as partially transparent.

The joint inner portion 2 extends out of the joint holder 4. In this case the second measuring element 7 is fixed to a section 8 of the joint inner portion which is outside the joint holder 4. The section 8 of the joint inner portion 2 is in the form of a simply stepped free end of the joint inner portion 2. The second measuring element 7 has an annular holding section 9. The annular holding section 9 is press-fitted onto the stepped section 8 of the joint inner portion 2 or onto an outer circumference of the section 8.

In this case the holding section 9 and the section 8 of the joint inner portion 2 that co-operates with the said holding section 9 form an rotation-preventing means 10 for preventing or blocking any relative movement or rotation of the second measuring element 7 relative to the joint inner portion 2. In this example embodiment the rotation-preventing means 10 is in the form of a flat area 11 on the outer circumference of the section 8 of the joint inner portion 2, which co-operates with another flat area 12 on an inside circumference of the holding section 9.

The second measuring element 7 has a web-like projection 13. The web-like projection 13 extends in the radial direction away from the holding section 9 and outward relative to a central longitudinal axis of the joint inner portion 2 (not shown). At a free end of the web-like projection 13 there is arranged a magnet 14 of the second measuring element 7. The magnet 14 is orientated so that it faces toward the first measuring element 6. In this example embodiment the magnet 14 is fitted at the front end of a free end of the projection 13. Here, the said front end faces toward the first measuring element 6. In particular, a plane of the front end is orientated parallel to the central longitudinal axis of the joint inner portion 2, at least when the joint inner portion 2 is in the undeflected position shown.

The magnet 14 is arranged inside a magnet holder 15. Here, the magnet holder 15 is shown as partially transparent. The magnet holder 15 is made of a plastic and the magnet 14 is completely surrounded by the plastic of the magnet holder 15. In this example embodiment the web-like projection 13 has two holes 16. For greater clarity only one hole 16 is provided with an index. The magnet holder 15 is injection-molded directly onto the free end of the web-like projection 13. In this case the plastic material of the magnet holder 15 passes through the holes 16, so that the magnet holder 15 is attached reliably to the projection 13, thereby excluding any relative movement between them.

The first measuring element 6 comprises a magnetic field sensor 17. In this case the magnetic field sensor 17 faces toward the magnet 14 of the second measuring element 7. The distance between the magnetic field sensor 17 and the magnet 14 is smaller than 10 mm. The first measuring element 6 is fixed on a flat surface section 18 of the structural component 3, close to the joint holder 4. In this example embodiment the flat surface section 18 is produced by a separate machining operation on the structural component 3. The first measuring element 6 is fixed to the structural component 3 by a fixing means 19. To co-operate with the fixing means 19 the structural component 3 comprises a fixing seat 20. In this example embodiment the fixing means 19 is in the form of a screw, which is screwed into the fixing seat 20.

In addition, in this example embodiment the structural component 3 has an orientation seat 21. The structure and function of the orientation seat 21 is explained in greater detail with reference to the next figure.

Figure 2:
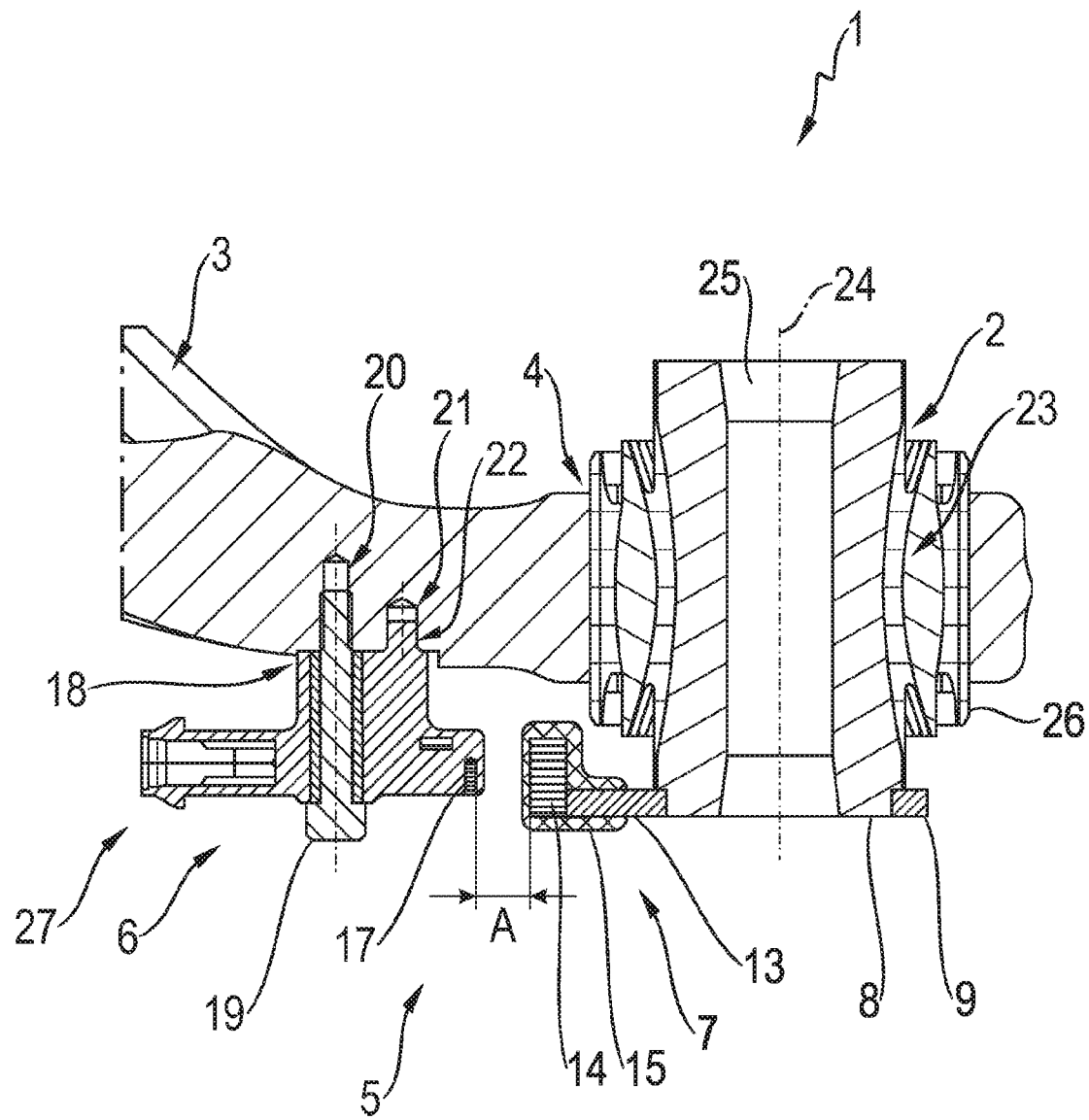
FIG. 2: Part of a sectioned side view of the first chassis component according to the invention shown in FIG. 1, FIG. 3: Part of a partially transparent view from above, of the first chassis component according to the invention shown in FIGS. 1 and 2, with a second measuring element in three different positions.

FIG. 2 shows part of a sectioned side view of the first chassis component 1 according to the invention as shown in FIG. 1. In this example embodiment the orientation seat 21 is in the form of a blind-hole-like cavity in the structural component 3. The first measuring element 6 comprises an orientation element 22 for the correctly orientated positioning of the first measuring element 6 on the structural component 3. Thanks to the co-operation of the orientation seat 21 with the orientation element 22 and in combination with the co-operation of the fixing means 19 with the fixing seat 20, the first measuring element 6 is unambiguously orientated and positioned on the structural component 3 and in relation to the second measuring element 7. In this case the magnetic field sensor 17 and the magnet 14 are positioned in such manner that the distance A between them is less than 10 mm.

In this example embodiment the joint inner portion 2 is in the form of a joint sleeve in combination with a rubber pad 23. The joint inner portion 2 has a central longitudinal axis 24. Concentrically with the central longitudinal axis 24 the joint inner portion 2 has a through-going opening 25. The rubber pad 23 is arranged between the joint inner portion 2 and an outer sleeve 26, In this example embodiment the outer sleeve 26 is made of metal. The joint inner portion 2, together with the rubber pad 3 and the outer sleeve 26, are press-fitted into the joint holder 4. Thus, the joint inner portion 2 together with the rubber pad 23 and the outer sleeve 26 form a rubber joint.

At an end facing away from the magnetic field sensor 17 the first measuring element 6 has a plug-in section 27. A signal line (not shown here) and/or an electric lead can be connected to the first measuring element 6 by means of the plug-in section 27. In that way a measurement signal of the measuring device 5 or of the first measuring element 6 can be relayed to an evaluation device (not shown here).

Figure 3:
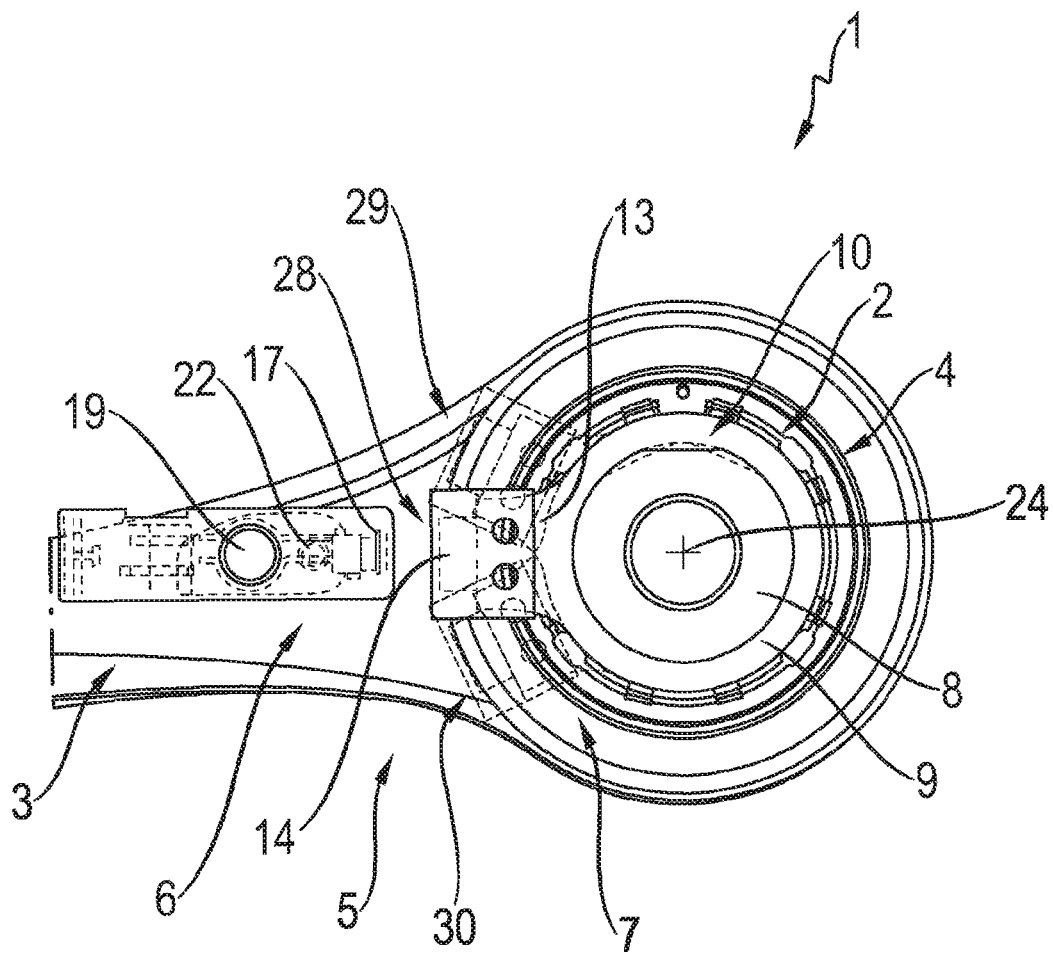

FIG. 3 shows part of a partially transparent view from above, of the first chassis component 1 according to the invention shown in FIGS. 1 and 2, with the second measuring element 7 in three different positions. The second measuring element 7 is in one case shown in a central initial position 28. In the initial position 28, which corresponds to an undeflected position of the joint inner portion 2, the magnet 14 is orientated toward the magnetic field sensor 17 with a minimum distance A, as in FIG. 2. In other words, in the initial position 28 the magnetic field sensor 17 and the magnet 14 are opposite one another.

In addition, the second measuring element 7 in the partially transparent representation is shown in two end positions 29 and 30 which differ from one another. The end positions 29 and 30 are obtained by virtue of a twisting or rotation of the joint inner portion 2 together with the second measuring element 7 about the central longitudinal axis 24. Owing to the resulting displacement of the magnet 14, this results in a magnetic field change that can be detected by the magnetic field sensor 17. From that, a relative position of the structural component 3 with respect to the joint inner portion 2 can be determined.

In this example embodiment, the first end position 29 is reached starting from the initial position 28 by a rotation about the central longitudinal axis 24 through +25°. The second end position 30 is reached starting from the initial position 28 by a rotation about the central longitudinal axis 24 through −25°. Thus, in this example embodiment, positions within an angular range of 50° can be detected by the measuring device 5.

Figure 4:
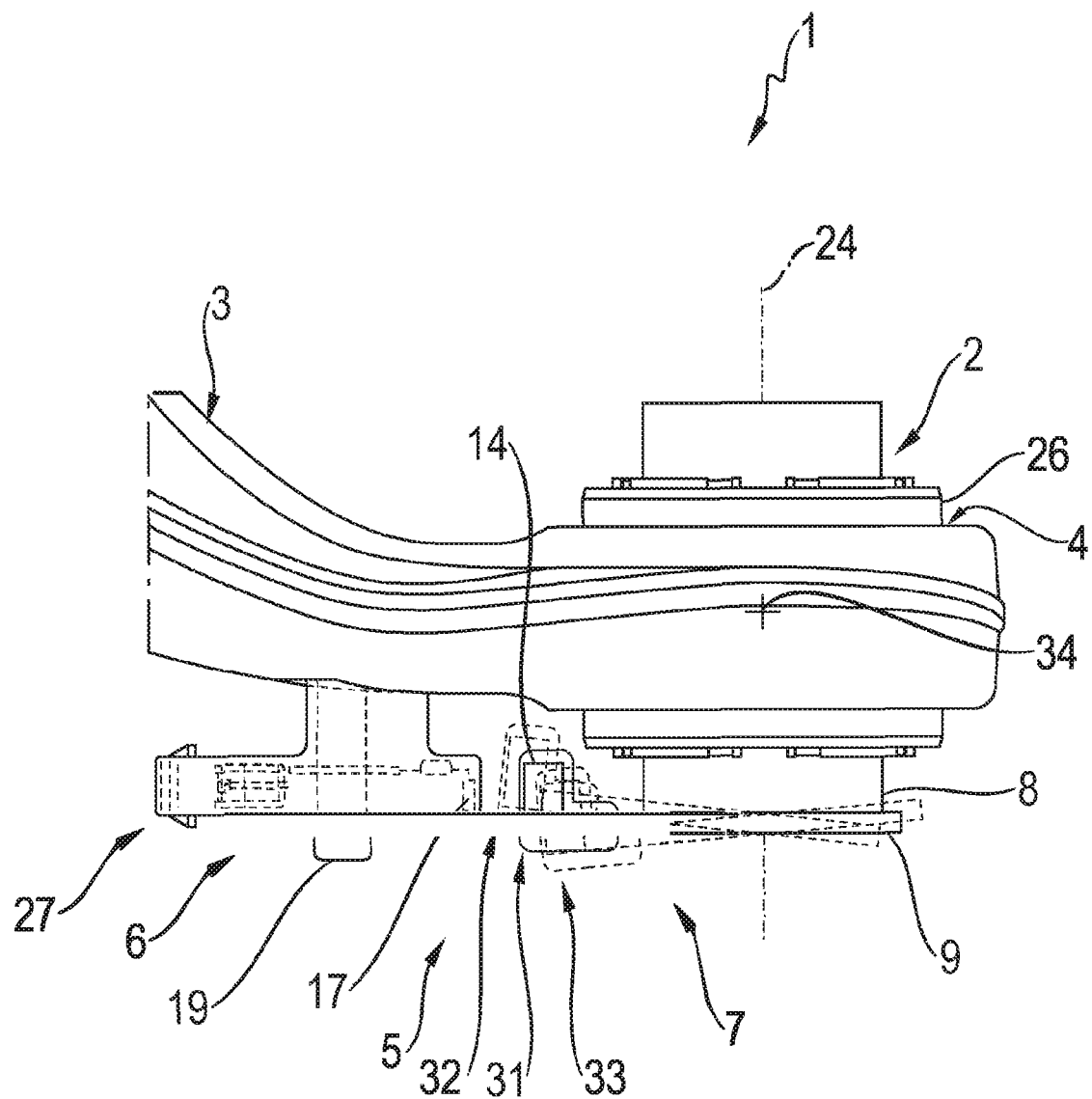
FIG. 4: Part of a partially transparent side view of the first chassis component according to the invention shown in FIGS. 1 and 2, with the second measuring element in three further different positions.

FIG. 4 shows part of a partially transparent side view of the first chassis component 1 according to the invention, shown in FIGS. 1 and 2, and with the second measuring element 7 in three further different positions. In the first place the second measuring element 7 is shown in a central initial position 31. Starting from that initial position 31, as indicated by the end positions 32, 33 shown, a tilt of the first measuring element 6 can take place about a rotation axis 34. In this case the rotation axis 34 extends perpendicularly to the central longitudinal axis 24. Furthermore, the rotation axis 34 extends through a joint mid-point of the joint inner portion 2.

Starting from the initial position 31, by virtue of a tilt through +6°, the magnet 14 of the second measuring element 7 reaches the first end position 32. Starting from the initial position 31, by virtue of a tilt through −6°, the magnet 14 of the second measuring element 7 reaches the first end position 33. Thus, in this case there is a maximum angular range of 12° for tilting about the rotation axis 34 and the mid-point of the joint. The magnetic field change brought about by the tilting can be detected by the magnetic field sensor 17.

Figure 5:
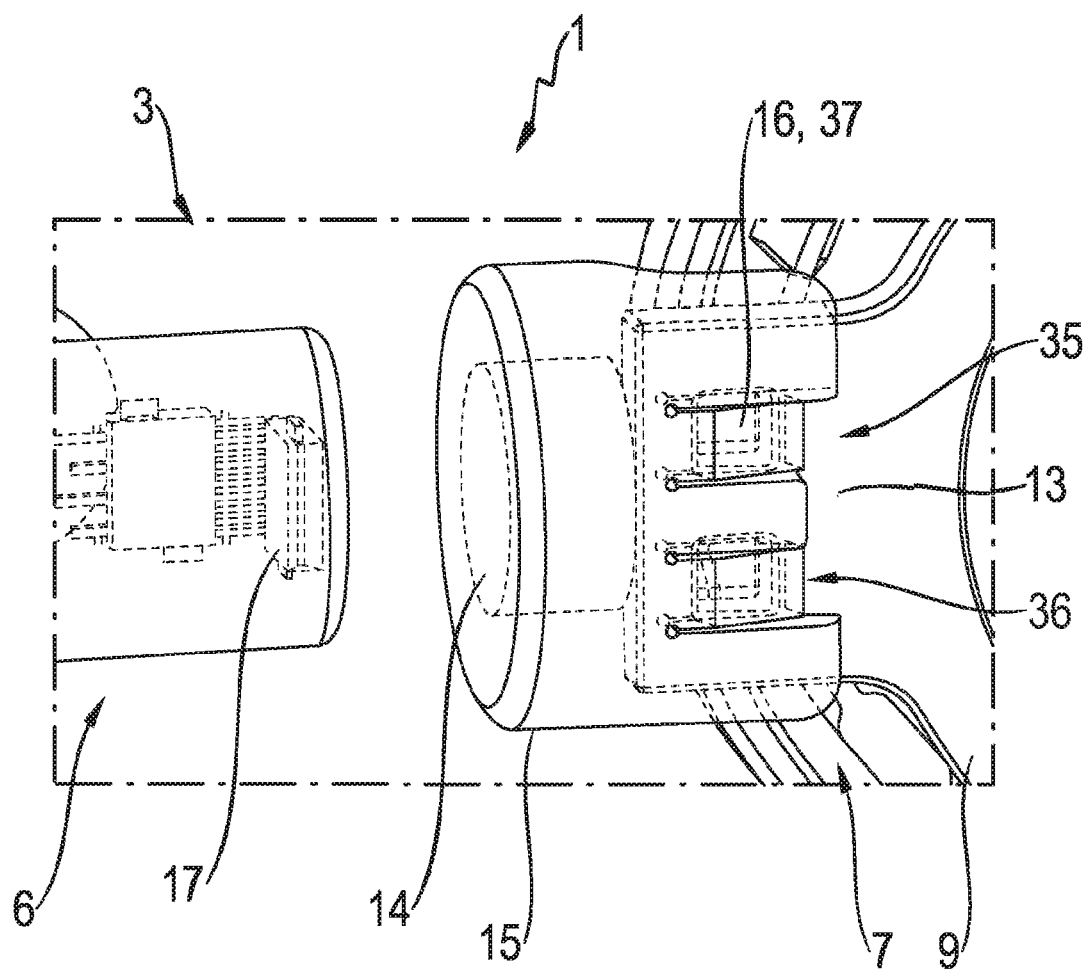
FIG. 5: Part of a perspective partially transparent view from above, of a first measuring element with a magnetic field sensor and a second measuring element with a magnet, in accordance with the first chassis component according to the invention shown in FIGS. 1 and 2, FIG. 6: Part of a perspective and partially transparent side view of a second chassis component according to the invention.

FIG. 5 shows part of a perspective partially transparent view from above, of the first measuring element 6 with the magnetic field sensor 17 and the second measuring element 7 with the magnet 14 in accordance with the first chassis component 1 according to the invention, as shown in FIGS. 1 and 2. The magnet holder 15 is in this case shown as transparent. Otherwise than in the version illustrated in FIGS. 1 to 4, in the variant shown here the magnet holder 15 is not injection-molded directly onto the free end of the web-like projection 13. Instead, the magnet holder 15 is attached to the web-like projection 13 by a releasable plug-in and latch connection 35. This enables the magnet 14 to be replaced or changed.

To form the plug-in and latch connection 35 in this example embodiment, the magnet holder 15 has two interlocking elements 36, although here, for the sake of greater clarity, only one interlocking element 36 is indexed. The web-like projection 13 has interlocking elements 37 designed to correspond with the interlocking elements 36. In this example embodiment, the interlocking elements 37 are in the form of latch receivers, in this case in the form of holes 16. The interlocking elements 36 of the magnet holder 15 are here in the form of latch detents, which engage or snap into the holes 16 with interlock.

In the chassis component 1 according to FIGS. 1 to 5, the magnetic field sensor 17 is positioned perpendicularly to the length of the structural component 3. Correspondingly, in accordance with the magnetic field sensor 17, the magnet 14 too is positioned perpendicularly to the length of the structural component 3, or to a plane of the holding section 9, and is arranged inside the magnet holder 15.

Figure 6:
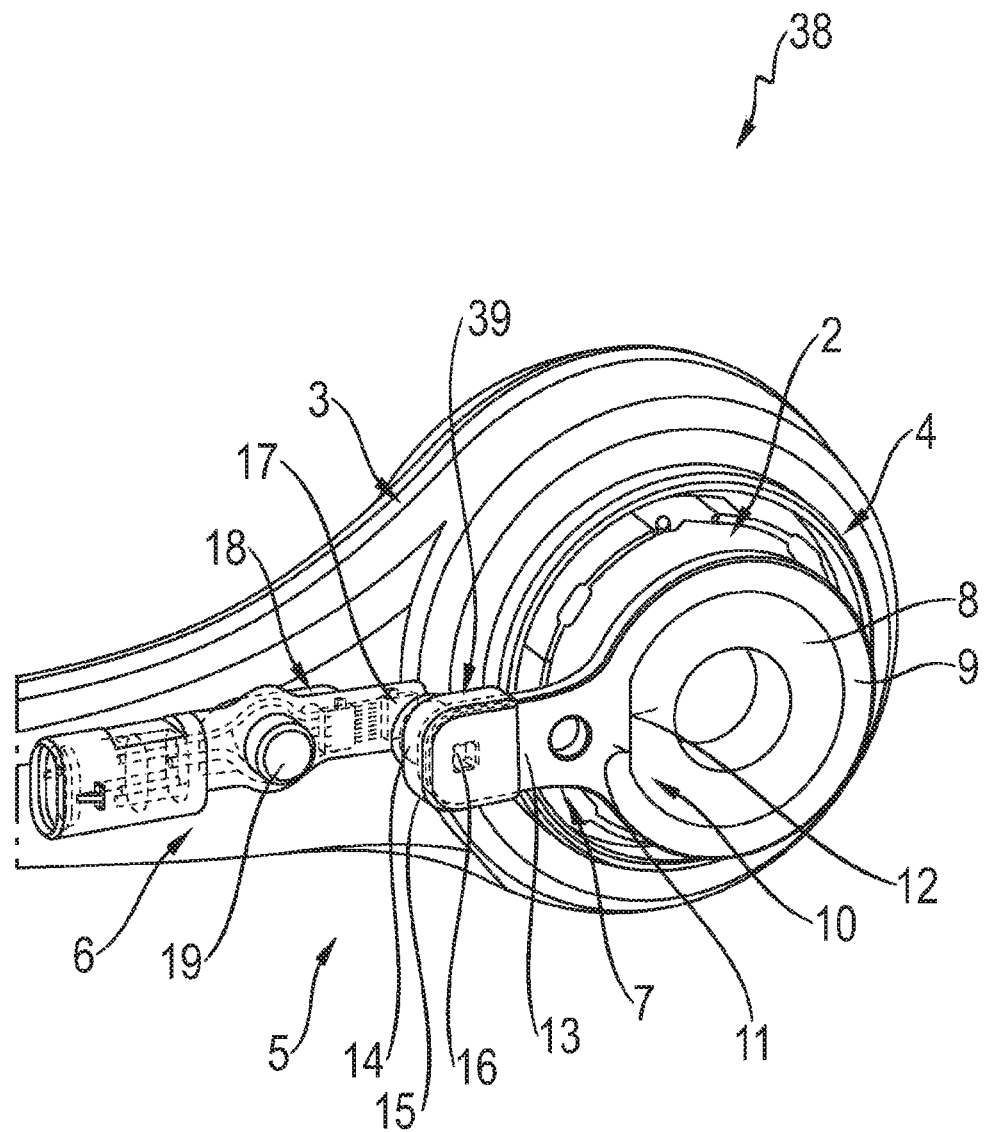

FIG. 6 shows part of a perspective and partially transparent side view of a second chassis component 38 according to the invention. The same features as previously are given the same indexes. To that extent, in order to avoid repetitions reference should also be made to the previous description.

Otherwise than in the chassis component 1, in the chassis component 38 shown here the magnet 14 is not arranged at the front of the free end of the projection 13. Instead, the magnet 14 is arranged in the area of a side 39 of the web-like projection 13, the side 39 facing toward the structural component 3. The magnetic field sensor 17 is arranged between the magnet 14 and the structural component 3.

Compared with the chassis component 1, owing to the arrangement of the magnet 14 and the magnetic field sensor 17 the configuration of the chassis component 38 shown here is somewhat flatter and thus space-saving.

Figure 7:
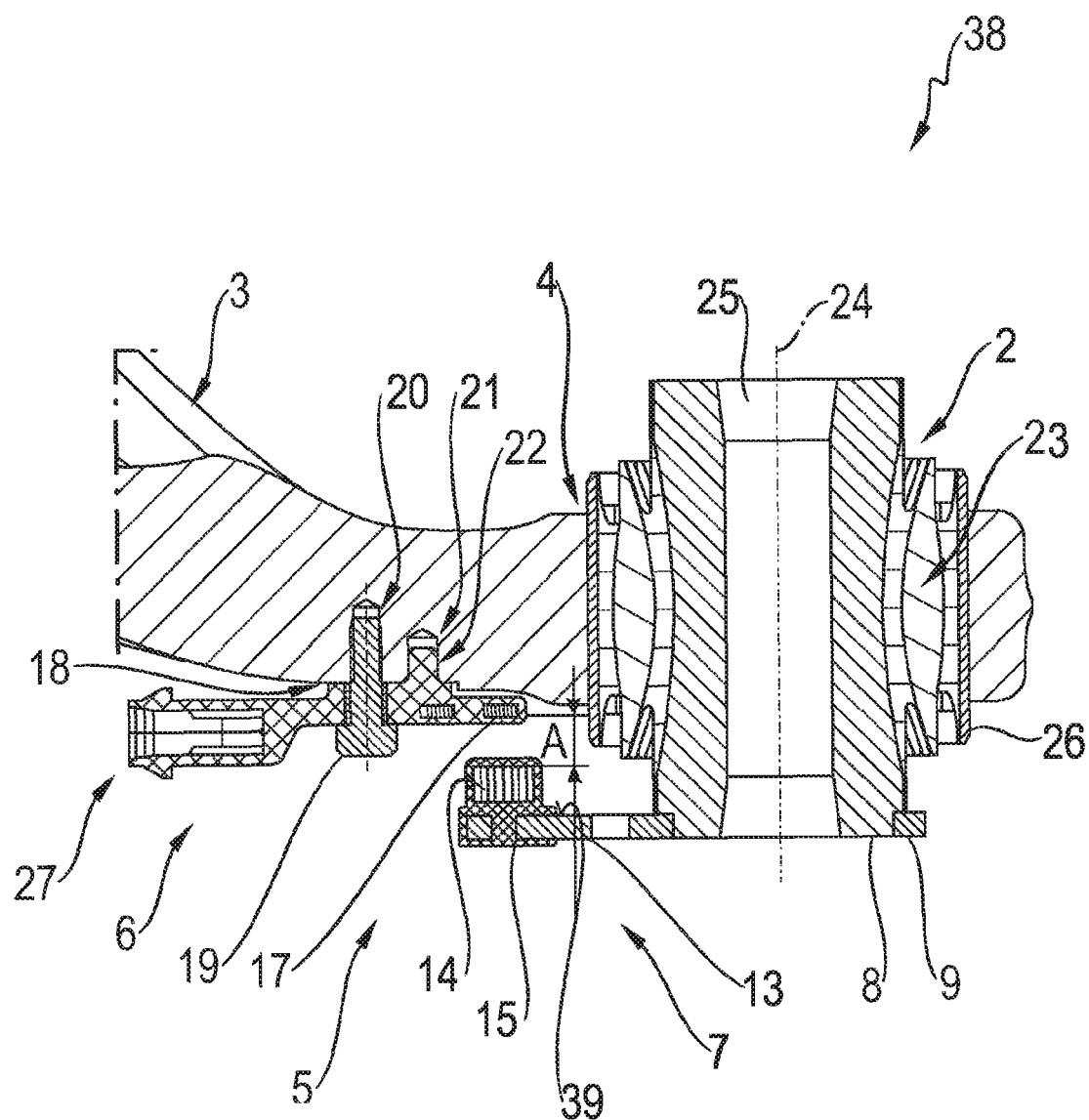
FIG. 7: Part of a sectioned side view of the second chassis component according to the invention shown in FIG. 6, FIG. 8: Part of a partially transparent view from above, of the second chassis component according to the invention shown in FIGS. 6 and 7, with a second measuring element in three different positions.

FIG. 7 shows part of a sectioned side view of the second chassis component 38 according to the invention according, to FIG. 6. The same features as before are given the same indexes. To that extent, in order to avoid repetitions reference should also be made to the earlier description.

Whereas in the chassis component 1 according to FIGS. 1 to 5 the distance A extends perpendicularly to the central longitudinal axis 24, in the chassis component 38 shown in this case the distance A extends in the axial direction or parallel to the central longitudinal axis 24.

Figure 8:
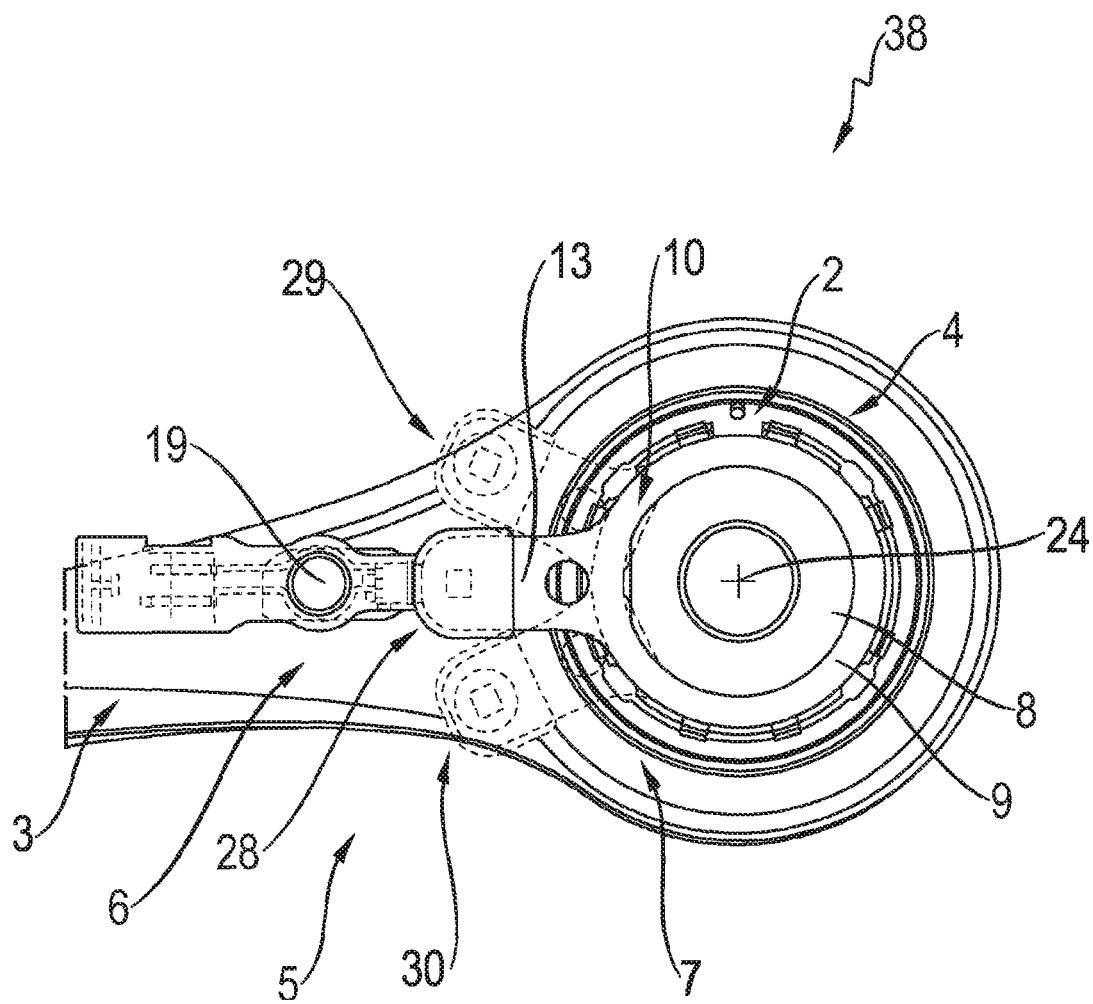

FIG. 8 shows part of a partially transparent view from above, of the second chassis component 38 according to the invention, shown in FIGS. 6 and 7, with the second measuring element 7 in three different positions. The same features are given the same indexes as before. To avoid repetitions, reference should in particular be made to the earlier Fit whose description is correspondingly applicable here.

Figure 9:
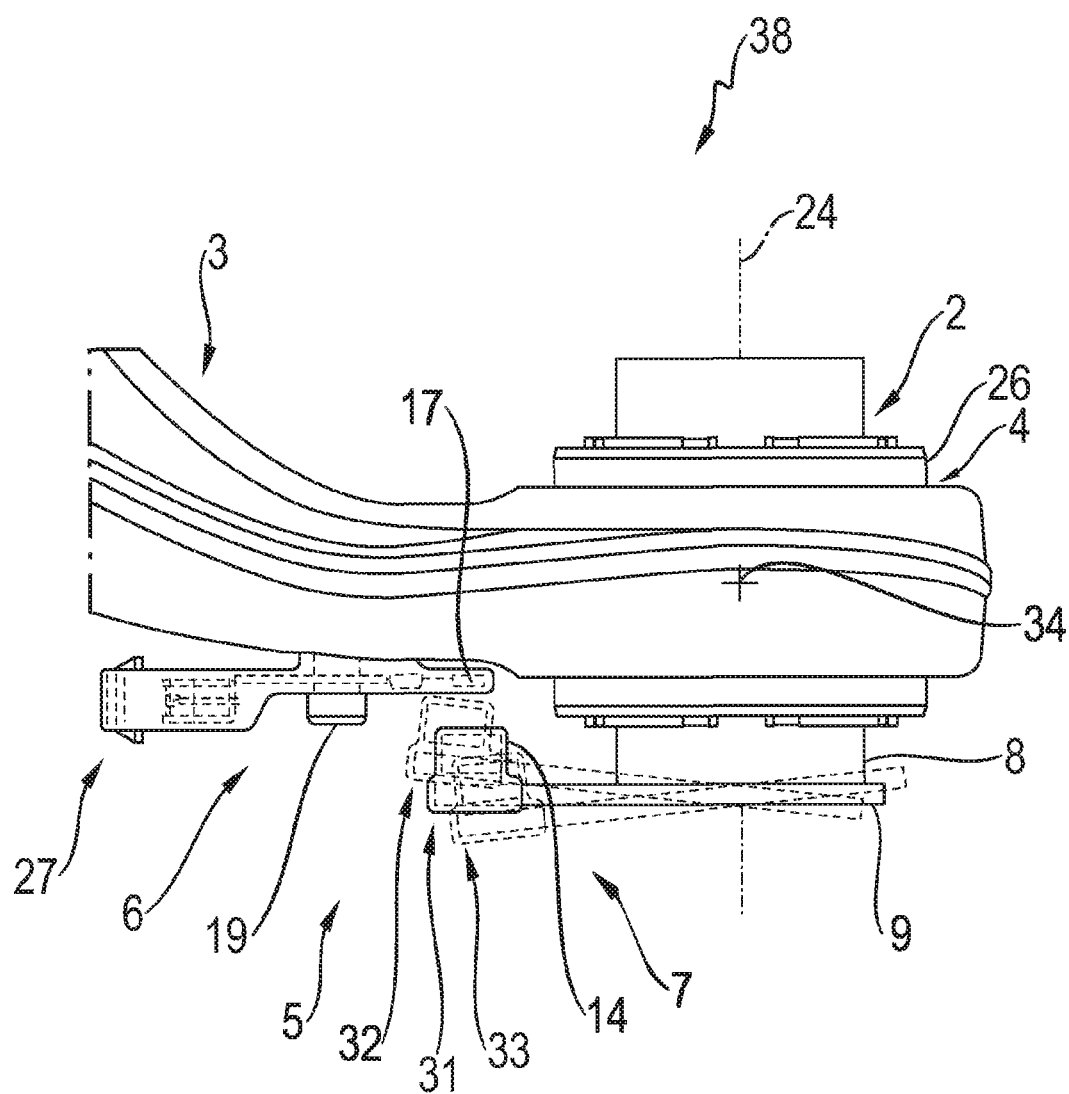
FIG. 9: Part of a partially transparent side view of the second chassis component according to the invention shown in FIGS. 6 and 7, with the second measuring element in three further different positions.

FIG. 9 shows part of a partially transparent side view of the second chassis component 38 according to the invention, shown in FIGS. 6 and 7, with the second measuring element 7 in three further different positions. The same features are given the same indexes as before. To that extent, to avoid repetitions reference should in particular also be made to the earlier description of the earlier FIG. 4, whose description is correspondingly applicable here.

Figure 10:
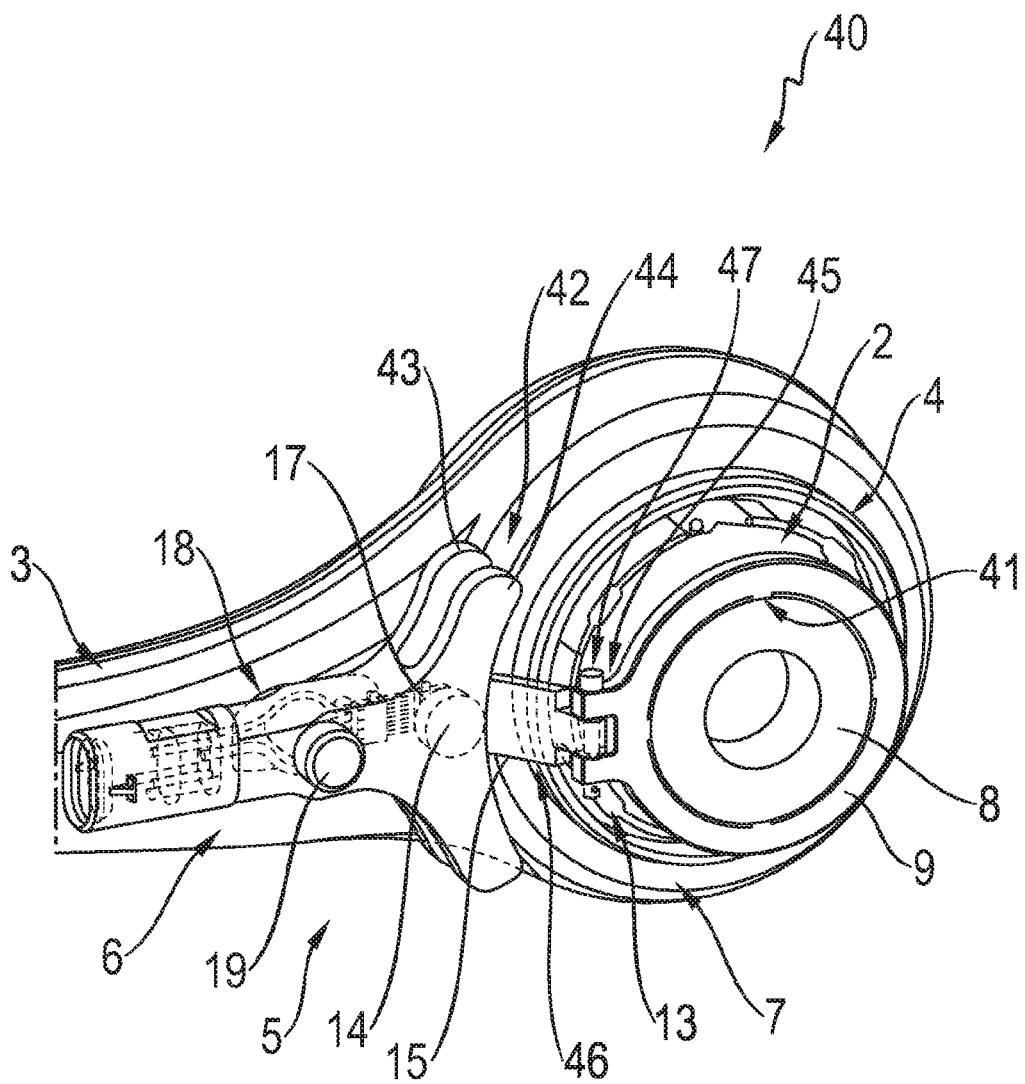
FIG. 10: Part of a perspective and partially transparent side view of a further chassis component according to the invention.

FIG. 10 shows part of a perspective and partially transparent side view of a further chassis component 40 according to the invention. The same features are given the same indexes as before. To that extent, to avoid repetitions reference should also be made to the earlier description.

In this example embodiment, the chassis component 40 has no rotation-preventing means 10. Instead, according to this example embodiment the holding section 9 of the second measuring element 7 comprises a number of holding elements 41 on its inside circumference. In this example embodiment a total of four holding elements 41 are distributed uniformly around the inside circumference of the annular holding section 9. The holding elements 41 are, for example, in this case in the form of fixing detents and are formed integrally with the holding section 9. By means of the holding elements 41 the second measuring element 7 is pressed onto the outer circumference of the section 8 of the joint inner portion 2 and at the same time held on it rotationally fixed relative to the joint inner portion 2. In this example embodiment, otherwise than in the variants shown in FIGS. 1 to 9, an orientated press-fitting of the joint formed by the joint inner portion, the rubber pad 23 and the outer sleeve 26 can be dispensed with.

In this example embodiment, the first measuring element 6 comprises a guideway 42. In this example embodiment, the guideway 42 is formed by two curved side-plates 43 and 44 a distance apart from one another. The guideway 42 is formed on an end of the first measuring element 6 that faces toward the second measuring element 7. Inside the guideway 42 the magnet 14 of the second measuring element 7 is guided. Thus, the magnet 14 is guided between the two side-plates 43, 44.

In this example embodiment, the web-like projection 13 is formed from a first projection section 45 and a second projection section 46. The two projection sections 45, 46 are connected to one another by a hinge 47 so that they can pivot relatively to one another. In this example embodiment the second projection section 46 at the same time forms the magnet holder 15, in which the magnet 14 is arranged in the area of a free end of the second projection section 46 facing away from the hinge 47.

Figure 11:
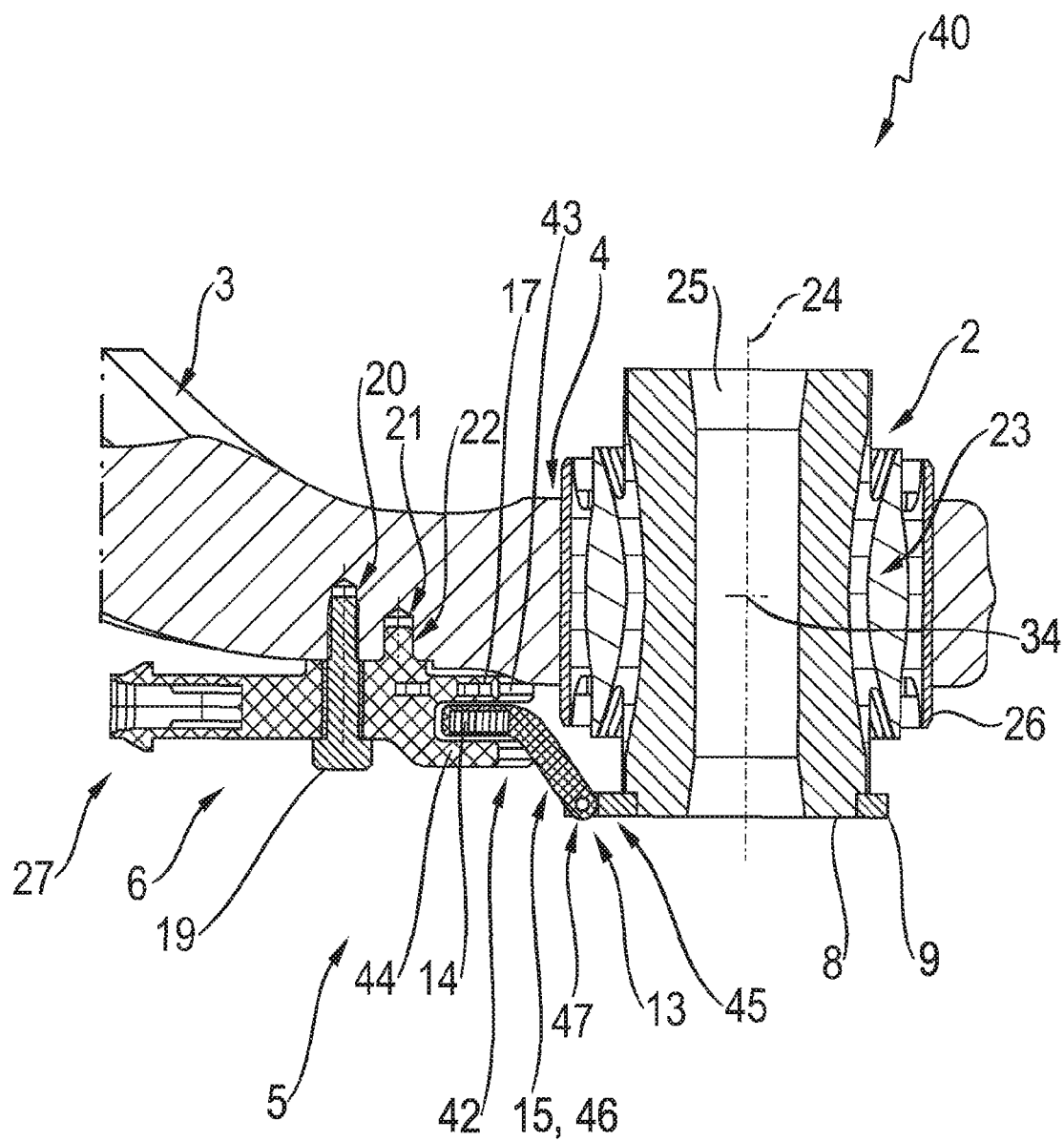
FIG. 11: Part of a sectioned side view of the further chassis component according to the invention shown in FIG. 10, FIG. 12: Part of a partially transparent view from above, of the further chassis component according to the invention shown in FIGS. 10 and 11, with a second measuring element in three different positions.

FIG. 11 shows part of a sectioned side view of the said further chassis component 40 according to the invention, as shown in FIG. 10. The same features as before are given the same indexes. To that extent, to avoid repetitions reference should also be made to the previous description.

The magnetic field sensor 17 of the first measuring element 6 is arranged inside the side-plate 43 of the guideway 42. The guideway 42 enables a rotation of the second measuring element 7 or the magnet 14 about the central longitudinal axis 24 of the joint inner portion 2. At the same time, the guideway 42 prevents or reduces tilting of the magnet 14 in a direction axial in relation to the central longitudinal axis 24. In that way a tilting movement of the joint inner portion 2 about the rotation axis 34 perpendicular to the central longitudinal axis 24 is compensated by the hinge 47. For that purpose, a pivot axis of the hinge 47 is orientated parallel to the rotation axis 34.

Figure 12:
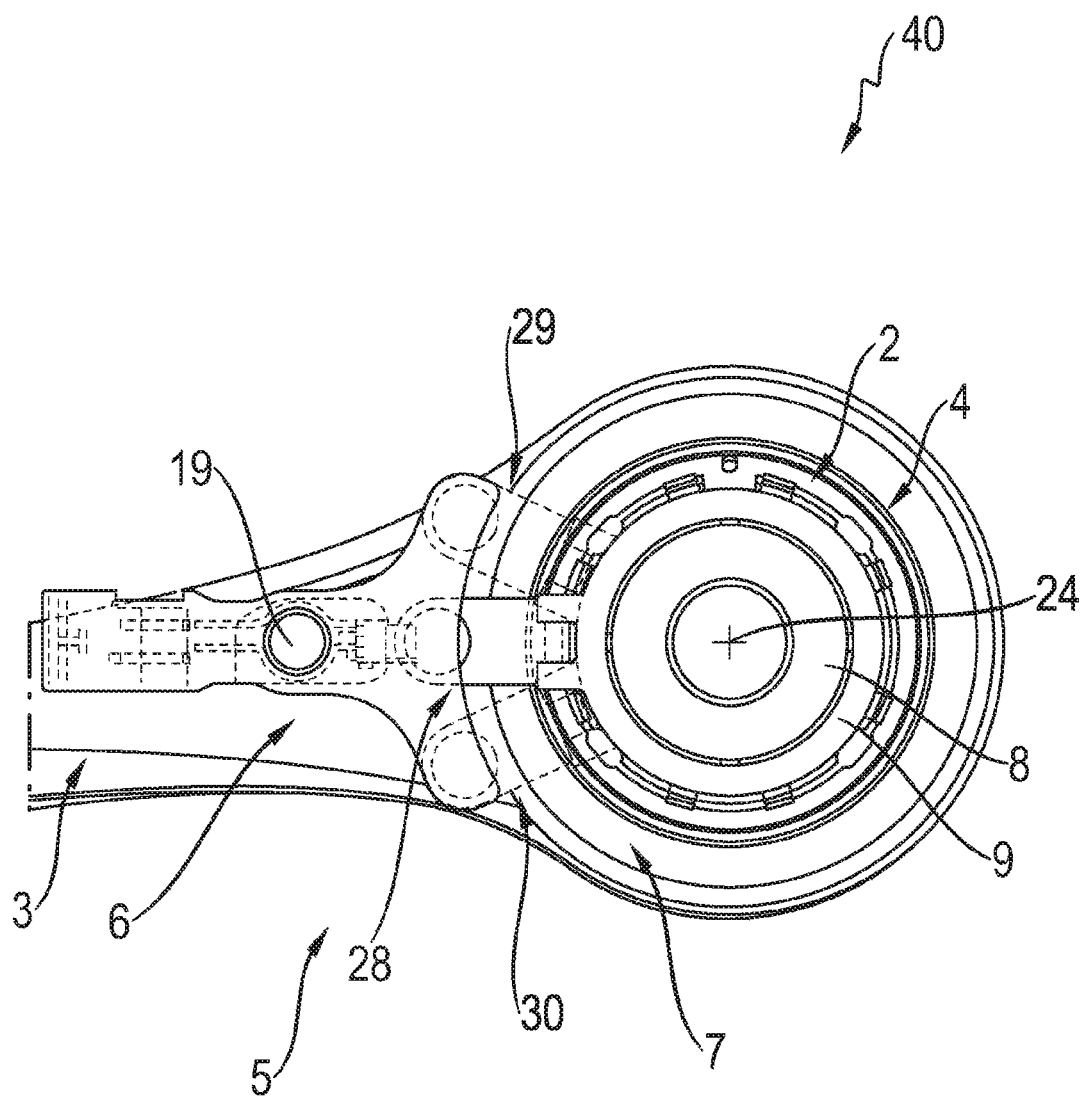

FIG. 12 shows part of a partially transparent view from above, of the further chassis component 40 according to the invention as shown in FIGS. 10 and 11, with the second measuring element 7 in three different positions. The same features are given the same indexes as before. To avoid repetitions, reference should be made in particular to the earlier description concerning FIGS. 3 and 8.

In this example embodiment, the first measuring element 6 has a single magnetic field sensor 17. Alternatively, the first measuring element 6 can have more than one, in particular three magnetic field sensors 17. For example, as already indicated here, a single magnetic field sensor 17 can be arranged centrally within the guideway 42 of the first measuring element 6. In that case, a distance between the central magnetic field sensor 17 and the magnet 14 in the initial position 28 is at its smallest.

In addition, the first measuring element 6 can have two further magnetic field sensors 17 (not shown here). In that case a second magnetic field sensor 17 can be arranged on the first measuring element 6 and inside the guideway 42 in such manner that the distance between the second magnetic field sensor 17 and the magnet 14 in the first end position 29 shown here is at its smallest. A third magnetic field sensor 17 (not shown here) can be arranged on the first measuring element 6 and inside the guideway 42 in such manner that a distance between the third magnetic field sensor 17 and the magnet 14 in the second end position 30 shown here is at its smallest.

Figure 13:
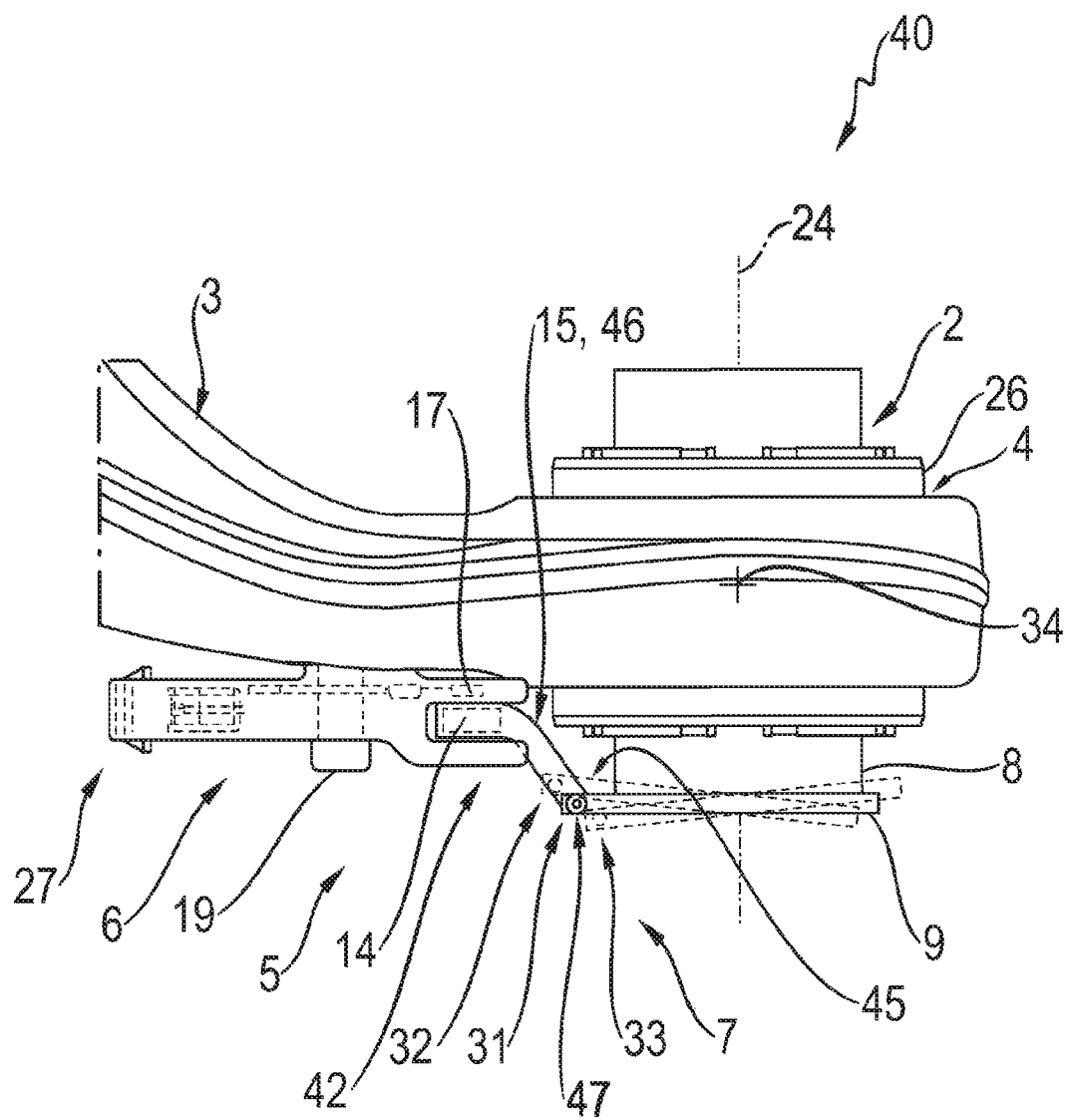
FIG. 13: Part of a partially transparent view from above, of the further chassis component according to the invention shown in FIGS. 10 and 11, with a second measuring element in three further different positions.

FIG. 13 shows part of a partially transparent side view of the further chassis component 40 according to the invention, as shown in FIGS. 10 and 11, with the second measuring element 7 in three further different positions. The same features are given the same indexes as before. To that extent, to avoid repetitions reference should also be made to the previous description, particularly with reference to FIGS. 4 and 9.

During a tilting movement of the joint inner portion 2 about the rotation axis 34 the holding section 9 and the first projection section 45 also tilt. However, owing to the hinge 47 and the guideway of the second projection section 46 and the magnet holder 15 inside the guideway 42, a displacement of the magnet 14 in a direction axial relative to the central longitudinal axis 24 is prevented or at least partially compensated or counteracted.

INDEXES

1 Chassis component
2 Joint inner portion
3 Structural component
4 Joint holder
5 Measuring device
6 First measuring element
7 Second measuring element
8 Section
9 Holding section
10 Rotation-preventing means
11 Flat area
12 Further flat area
13 Web-like projection
14 Magnet
15 Magnet holder
16 Hole
17 Magnetic field sensor
18 Surface section
19 Fixing means
20 Fixing seat
21 Orientation seat
22 Orientation element
23 Rubber pad
24 Central longitudinal axis
25 Through-going opening
26 Outer sleeve
27 Plug-in section
28 Initial position
29 End position
30 End position
31 Initial position
32 End position
33 End position
34 Rotation axis
35 Plug-in/latch connection
36 Interlocking element
37 Interlocking element
38 Chassis component
39 Side
40 Chassis component
41 Holding element
42 Guideway
43 Side-plate
44 Side-plate
45 First projection section
46 Second projection section
47 Hinge
A distance

The invention claimed is:

1. A chassis component comprising:
a joint inner portion;
a structural component with a joint holder, wherein the joint inner portion is fitted and able to move in an articulated manner in the joint holder and wherein a section of the joint inner portion extends out of the joint holder; and
a measuring device configured to determine a relative position of the joint inner portion with respect to the structural component, wherein the measuring device comprises a first measuring element and a second measuring element, and the first measuring element is arranged on the structural component and the second measuring element is fixed onto the section of the joint inner portion that extends out of the joint holder;
wherein an annular holding section of the second measuring element is configured to be pushed and/or pressed onto the section of the joint inner portion and/or onto an outer circumference of the section of the joint inner portion.

2. The chassis component according to claim 1, wherein the first measuring element is fixed onto an area and/or a flat surface section of the structural component.

3. The chassis component according to claim 2, wherein the first measuring element is positioned adjacent to the joint holder.

4. The chassis component according to claim 2, wherein the structural component comprises a fixing seat for fixing the first measuring element onto the area and/or the flat surface section by means of a fixing means that co-operates with the fixing seat.

5. The chassis component according to claim 1, wherein the first measuring element comprises an orientation element for its correct orientation and/or fixing onto the structural component.

6. The chassis component according to claim 5, wherein the orientation element is held and/or plugged into an orientation seat of the structural component.

7. The chassis component according to claim 1, wherein the section of the joint inner portion carrying the second measuring element is in a form of a stepped free end of the joint inner portion.

8. The chassis component according to claim 1, wherein the joint inner portion is in the form of a ball sleeve, a joint sleeve or a rubber bearing, and the chassis component is in the form of a control arm.

9. A chassis component comprising:
a joint inner portion;
a structural component with a joint holder, wherein the joint inner portion is fitted and able to move in an articulated manner in the joint holder and wherein a section of the joint inner portion extends out of the joint holder; and
a measuring device configured to determine a relative position of the joint inner portion with respect to the structural component, wherein the measuring device comprises a first measuring element and a second measuring element, and the first measuring element is arranged on the structural component and the second measuring element is fixed onto the section of the joint inner portion that extends out of the joint holder;
wherein the section of the joint inner portion carrying the second measuring element is in a form of a stepped free end of the joint inner portion; and
wherein an annular holding section of the second measuring element is configured to be pushed and/or pressed onto the section of the joint inner portion and/or onto an outer circumference of the section of the joint inner portion.

10. The chassis component according to claim 9, wherein the annular holding section of the second measuring element, and the section of the joint inner portion that co-operates with the second measuring element form a rotation-preventing means for preventing and/or blocking a relative movement and/or rotation of the second measuring element with respect to the joint inner portion.

11. The chassis component according to claim 10, wherein the rotation-preventing means has at least one flat area on an outer circumference of the section of the joint inner portion, the at least one flat area cooperating with a correspondingly shaped, further flat area on an inside circumference of the second measuring element.

12. The chassis component according to claim 11, wherein the correspondingly shaped, further flat area is on an inside circumference of the holding section of the second measuring element.

13. A chassis component comprising:
a joint inner portion;
a structural component with a joint holder, wherein the joint inner portion is fitted and able to move in an articulated manner in the joint holder and wherein a section of the joint inner portion extends out of the joint holder; and
a measuring device configured to determine a relative position of the joint inner portion with respect to the structural component, wherein the measuring device comprises a first measuring element and a second measuring element, and the first measuring element is arranged on the structural component and the second measuring element is fixed onto the section of the joint inner portion that extends out of the joint holder;
wherein the first measuring element comprises at least one magnetic field sensor and the second measuring element comprises a magnet, wherein the magnet is arranged at a free end of a web-like projection of the second measuring element and faces toward the first measuring element, wherein the web-like projection extends in a radial direction from a holding section of the second measuring element outward over an outer circumference of the joint inner portion.

14. The chassis component according to claim 13, wherein the magnet is arranged and/or encapsulated in a magnet holder made of plastic, and the magnet and/or the magnet holder is attached by means of a releasable plug-in and/or latch connection to the web-like projection.

15. The chassis component according to claim 13, wherein the magnet is arranged and/or encapsulated in a magnet holder of plastic that is injection-molded directly onto the web-like projection by means of an injection-molding process.

16. The chassis component according to claim 13, wherein the magnet of the second measuring element is guided at least partially inside a guideway of the first measuring element, and by means of the guideway a rotation of the second measuring element about a central longitudinal axis of the joint inner portion is made possible and at the same time tilting of the magnet of the second measuring element axially relative to the central longitudinal axis is at least partially compensated, counteracted and/or blocked.

17. The chassis component according to claim 16, wherein the web-like projection of the second measuring element comprises a first projection section pivotably connected by a hinge to a second projection section, wherein the web-like projection is configured to compensate a tilting movement of the second measuring element axially relative to the central longitudinal axis.

18. The chassis component according to claim 17, wherein the joint inner portion is in the form of a ball sleeve, a joint sleeve or a rubber bearing, and the chassis component is in the form of a control arm.

* * * * *